United States Patent [19]

Willkens et al.

[11] Patent Number: 5,061,416

[45] Date of Patent: Oct. 29, 1991

[54] PROCESS FOR THE MANUFACTURE OF FRIABLE SILICON NITRIDE BODIES

[75] Inventors: Craig A. Willkens, Sterling; Normand D. Corbin, Northboro; Brian J. Caprera, Southbridge, all of Mass.

[73] Assignee: Norton Company, Worcester, Mass.

[21] Appl. No.: 428,710

[22] Filed: Oct. 30, 1989

[51] Int. Cl.$^5$ .............................................. C04B 41/85
[52] U.S. Cl. ..................................... 264/28; 264/343; 264/348; 241/23
[58] Field of Search .......................... 264/28, 343, 348; 241/23

[56] References Cited

U.S. PATENT DOCUMENTS 4,919,852  4/1990  Green ..................................... 264/11

Primary Examiner—James Derrington
Attorney, Agent, or Firm—Volker Ulbrich

[57] ABSTRACT

A friable silicon nitride body is prepared by infiltrating a non-friable silicon nitride body with a fluid which expands upon freezing, rapidly freezing the fluid, and thawing the frozen fluid. Silicon nitride flakes and chunks obtained with only light pressure on the friable body may then be final milled to a desired particle size more rapidly and with less energy input than with conventionally processed silicon nitride. The silicon nitride body may have a higher density than has previously been used to prepare silicon nitride powders, thereby preventing the generation of potentially hazardous whiskers in the final powder product.

11 Claims, No Drawings

PROCESS FOR THE MANUFACTURE OF FRIABLE SILICON NITRIDE BODIES

TECHNICAL FIELD

This invention relates to an improved process for the manufacture of friable silicon nitride bodies, by means of a freezer-thaw procedure, which bodies need only be final milled to form silicon nitride powder.

BACKGROUND AND INFORMATION DISCLOSURE STATEMENT

United States Patents

| | | |
|---|---|---|
| 3,937,792 | February 10, 1976 | R. J. Lumby |
| 4,127,630 | November 28, 1978 | M. E. Washburn |
| 4,869,943 | September 26, 1989 | N. D. Corbin et al. |

Silicon nitride has recently become a very promising material for structural ceramic applications due to its high strength properties and its excellent electrical insulation properties. Thus, the demand for commercial quantities of silicon nitride has increased dramatically and there are many efforts underway to manufacture silicon nitride powder in a more economical, safer manner and in a purer form.

The most common current process for manufacturing silicon nitride powder entails nitriding a dry, relatively loose-packed bed of silicon powder containing up to about 20 wt % silicon nitride seed. See for example, U.S. Pat. Nos. 3,937,792 and 4,127,630. As defined herein a "bed of silicon powder" comprises silicon powder which has been formed by some means, e.g. slip cast or pressed or otherwise, into a cake. The pore structure of such a loosely-packed silicon bed is very large, broad and non-uniform. As a result, during nitriding whiskers often grow into any voids that are greater than about ten microns. Such whiskers may be a health hazard which makes the nitriding process somewhat dangerous to run.

To prepare silicon nitride powder from the solid silicon nitride bed, the bed must first be subjected to a coarse crushing (e.g. in a hammerhill or jaw crusher) to produce pieces which are of a size suitable for subsequent final milling into silicon nitride powder. The coarse crushing step is quite energy intensive, generates considerable dust, and also potentially contaminates the powder with iron and/or tungsten carbide from the equipment.

It is an object of the present invention to produce a friable silicon nitride body which can be directly final milled, thereby overcoming the problems of the prior art process and safely and economically producing a commercial grade of silicon nitride powder, particularly one that contains little or no silicon nitride whisker contamination.

SUMMARY OF THE INVENTION

The present invention is directed to a novel process for making a friable silicon nitride body. The process generally comprises (i) infiltrating a slip cast reaction bonded silicon nitride body having a density greater than about 1.5 g/cc with a fluid which expands upon freezing, such as water; (ii) freezing the infiltrated silicon nitride material in such a manner that the surfaces freeze before the central core; and (iii) allowing the fluid in the silicon nitride material to thaw to room temperature. The resultant body is friable, i.e. easily crumbled or pulverized, and can be broken into flakes and small chunks usually by mere finger pressure. The flakes and small chunks formed can be sent directly to a final milling operation, thereby avoiding the coarse crushing procedure.

Because this process avoids the need to use machinery such as hammermills to break beds of silicon nitride into pieces suitable for milling, the silicon nitride material used in the process of the present invention may be prepared from a cast or pressed silicon powder bed having a relatively high density of about 1.0 to 1.6 g/cc, which after nitridation results in silicon nitride having a substantially uniform pore structure. As a result, there are substantially no voids present greater than about 10 microns in which whiskers can grow. Thus the process results in essentially eliminating whisker growth and results in a whisker-free product. By eliminating the need for heavy crushing of the silicon nitride beds, the process eliminates the need for the costly crushing equipment, the considerable dust created by such crushing operations, and the contaminations that may result.

DESCRIPTION OF THE PREFERRED EMBODIMENTS

More particularly, the present invention is directed to a process for manufacturing a friable silicon nitride body wherein the first step comprises infiltrating a slip cast body of nitrided silicon material with a fluid which will fill the pores of the silicon nitride body. The process is particularly useful with reaction bonded silicon nitride material (RBSN) having a density of about 1.5 to 2.6, and more preferably about 2.0 to 2.3, g/cc. While it is presently preferred to infiltrate with water, other fluids which expand upon freezing, such as silicon and gallium may also be used.

In order for the process to work, the fluid must infiltrate into at least some of the pores of the silicon nitride. If the fluid is only able to infiltrate the pores near the surface of the silicon nitride body, then only those portions of the body will become friable, i.e. readily break apart, after the freezing and thawing steps are performed. Infiltration of the fluid throughout the body will subject the entire body of silicon nitride to the treatment so that it is completely friable. It is presently preferred to infiltrate the silicon nitride body by immersing it into the fluid and then evacuating the body. Depending upon the thickness of the body, which will normally range from about 0.5 to 2.0 cm, it may be desirable to infiltrate the body with water, as the fluid, under a vacuum of below about 100 mm Hg at room temperature to increase the extent of infiltration. Below 24 mm Hg at room temperature, water will boil. The extent of vacuum and the period of infiltration will depend upon the density of the silicon nitride body being processed, its thickness and the wettability of the fluid. For example, to achieve substantially complete water infiltration of a silicon nitride body having dimensions of 5×5×0.7 cm and a density of 2.4 g/cc, the body is placed in the water and infiltrated under a vacuum of about 35 mm Hg for a period of about 1 hour and then the vacuum is broken and the body sits in the water overnight. The vacuum technique has not been found advantageous if the density of the silicon nitride bed is below about 2.0 g/cc.

Another technique which has been found useful in aiding the process is to bake the silicon nitride material at an elevated temperature, i.e. about 100° to 220° C. for about 1 to 18 hours, prior to infiltrating with the fluid. This has been found to remove adsorbed materials that otherwise may hinder wetting and infiltration.

Still another technique found useful to improve infiltration is to boil the body in the fluid at atmospheric pressure for a period of about ½ to 5, preferably about 2 to 3 hours.

After the silicon nitride has been infiltrated with the fluid, the fluid is rapidly frozen, generally to a temperature below about −195° C., and more preferably to about −200° to −205° C., at a rate of freezing of about 20 to 100, and more preferably about 40° to 70° C./min. The rapid freezing of the fluid is important since freezing at a slower rate in, for example, a conventional freezer has not been found effective. The rapid freezing forces the fluid in the exterior of the silicon nitride to freeze before the fluid in the interior which prevents migration of the interior fluid to the surface. This results in internal stresses being created when the interior fluid does finally freeze and expand. It is presently preferred to perform the rapid freezing process by immersing the infiltrated silicon nitride bed in liquid nitrogen, although other liquefied gases may be used such as helium, argon, and oxygen.

After the rapid freezing of the infiltrated silicon nitride body, it is allowed to thaw to room temperature or higher, i.e. about 25° to 200° C., in an oven. The thawing generally takes about 0.5 to 5 hours. Multiple freeze/thaw treatments may be used, especially with relatively low density silicon nitride materials, i.e. those having a density of about 1.7 to 2.0 g/cc. The use of up to 10, though more preferably only up to 5, multiple treatments appears to improve the results for the low density bodies.

After the freeze/thaw cycle(s) are completed, the silicon nitride body is friable, i.e. it can be easily broken or crumbled by hand or other such light pressure into flakes and small chunks ranging in size of from about 0.1 to 10 mm. The resultant flakes and small chunks of silicon nitride may then be final milled by conventional means to a desired particle size, i.e. less than about 10 microns.

Further preferred details of the process are included in the following non-limiting examples in which all parts and percents are by weight unless otherwise specified:

COMPARATIVE EXAMPLE A

A bed of RBSN 5×5×0.7 cm prepared from silicon powder having a density of 1.5 g/cc was coarse crushed with a hammermill to about ⅜" chunks and then fed to a planetary ball mill using isopropanol. After thirty (30) minutes, there was less than 1% powder finer than 100 U.S. mesh. There were no whiskers evident as examined by scanning electron microscopy (SEM).

COMPARATIVE EXAMPLE B

A nitrided bed of silicon powder was prepared from silicon powder having a density of only 0.60 g/cc. The bed of silicon powder was not precompacted before nitridation and possessed a broad, coarse pore size distribution. After nitridation, the silicon nitride body was coarse crushed with a hammermill to a −20 U.S. mesh. After planetary milling for 30 minutes there was 95% powder finer than 100 U.S. mesh, but there was also a significant amount of whisker morphology, as determined by SEM. The hammer milling also added 200 ppm of iron contamination.

EXAMPLE I

A bed of RBSN 5×5×0.7 cm, prepared from silicon powder having a density of 1.5 g/cc, nitrided density 2.4 g/cc, was boiled in deionized water for one hour, allowed to cool and soak in water for 24 hours, submersed in liquid nitrogen (−200° C.) for 20 minutes, and thawed in an oven at 200° C. for two hours. The top and bottom ⅛ inch thick surfaces of the piece were friable and were easily removed from the core with only finger pressure.

EXAMPLE II

The procedure of Example I was repeated except a longer boiling time of five hours was used. Large cracks appeared in the piece during thawing. The complete body was friable, breaking easily with only finger pressure into ¼ inch chunks and smaller.

EXAMPLE III

The procedure of Example I was repeated except, instead of boiling the body in water to infiltrate the pores, the body was placed in a vacuum chamber for 30 minutes at a vacuum level about of 20 mm Hg, balanced above a container of water. At the end of 30 minutes the body was plunged into the container of water and allowed to soak overnight. The infiltrated body was then submersed in liquid nitrogen for 20 minutes, and then thawed in an oven at 200° C. for two hours. After thawing, the bed fractured to ½ inch pieces by itself yielding pieces which were friable, and could be broken by hand, into ⅛ inch chunks and smaller.

EXAMPLE IV

The procedure of Example III was repeated except that, prior to infiltration, the nitrided body was placed in an oven at 200° C. for 30 minutes to drive off adsorbed species that might inhibit wetting and/or infiltration. The baked body was immediately set up for vacuum infiltration as in Example III. The piece cracked in the liquid nitrogen and, after thawing was friable with mere hand pressure being sufficient to break it into 1/16 inch pieces and smaller (some even as small as 0.1 mm). The pieces were fed into a planetary mill and milled for 30 minutes. After milling 100% of the powder was finer than 200 U.S. mesh. There was no evidence of whisker morphology by SEM. No iron contamination other than that native in the starting silicon was detected in the powder prepared by this process.

COMPARATIVE EXAMPLE C

The procedure of Example IV was repeated except that instead of freezing rapidly by immersing the body in liquid nitrogen the water infiltrated body was placed in a household refrigerator freezer for 48 hours at −18° C. After drying at 200° C. for 2 hours there were no cracks or apparent weakening of the piece. This demonstrates the need for rapid freezing to force the surface to freeze before the interior, preventing the interior water from migrating to the surface, thus creating stresses when the interior freezes that cause the material to crack into fine pieces.

COMPARATIVE EXAMPLE D

The procedure of Example I was followed except that instead of boiling at 1 atm (14.7 psi) in an open container, the cake was pressure cooked at 28 psi for five hours. After freezing and drying as in Example I, only the edges were even slightly friable leaving a large core piece.

EXAMPLE V

The procedure of Example IV is followed except that instead of a 2.4 g/cc RBSN bed, a lower density 1.8 g/cc bed is used (nitriding being more consistent with lower density beds and bed thickness can be increased and still be nitrided without leaving a residual silicon core.) After similar freezing and drying as Example IV, there are some cracks but no fine fracturing in any of the samples. The low density pieces are then submersed in a beaker of water at ambient pressure and temperature for 15 minutes, grasped with tongs, removed from the water and immediately submersed in liquid nitrogen for 20 minutes, removed, and submersed back in room temperature water. This cycle is repeated five times. The cake falls apart by itself to pieces ¼ inch and smaller. There is apparently a "fatigue" effect in which initial fine cracks or agglomerate structures first fail, followed by succeeding finer structures. The pieces are fed into a planetary mill and after milling for 10 minutes 100% of the powder is finer than 200 U.S. mesh. There is no evidence of whisker morphology as determined by SEM.

For comparison purposes, a similar low density bed is broken into ⅛ inch chunks with a hammermill and, after a similarly planetary milling treatment, only 60% are finer than 200 U.S. mesh.

What is claimed is:

1. A process for producing a friable silicon nitride body comprising (i) infiltrating a reaction bonded silicon nitride body which has a density of greater than about 1.5 g/cc, outside surfaces, and a central core, with a fluid which will expand upon freezing, (ii) freezing the fluid in the infiltrated body so that the fluid in the outside surfaces of the body freezes before the fluid in the central core, and (iii) thawing the frozen body of silicon nitride.

2. The process of claim 1 further comprising breaking the friable body into pieces suitable for final milling into a powder.

3. The process of claim 1, wherein the fluid is water.

4. The process of claim 1, wherein the infiltration is performed under a vacuum below about 100 mm Hg.

5. The process of claim 1, wherein the freezing comprises immersing the fluid impregnated silicon nitride body in a liquefied gas.

6. The process of claim 5, wherein the liquefied gas is nitrogen.

7. The process of claim 1, wherein steps (ii) and (iii) are repeated up to about 10 times.

8. A process for preparing a friable silicon nitride body comprising (i) infiltrating a body of non-friable reaction bonded silicon nitride with water by immersing the bed in water, (ii) rapidly freezing the water-infiltrated body by immersing it into a liquified gas, and (iii) thawing the body to at least about room temperature.

9. The process of claim 8, wherein the infiltration is performed at a pressure below atmospheric pressure.

10. The process of claim 8, wherein prior to infiltrating with water the body is baked for about 1 to 24 hours at a temperature of about 100° to 220° C.

11. The process of claim 10, wherein the liquefied gas is nitrogen.

* * * * *